United States Patent
Ikeda et al.

(10) Patent No.: US 7,126,701 B2
(45) Date of Patent: Oct. 24, 2006

(54) PAGE DATA PROCESSOR, PAGE DATA PROCESSING METHOD AND PROGRAM

(75) Inventors: Iwata Ikeda, Kyoto (JP); Takako Kato, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 798 days.

(21) Appl. No.: 10/263,825

(22) Filed: Oct. 4, 2002

(65) Prior Publication Data

US 2003/0067614 A1   Apr. 10, 2003

(30) Foreign Application Priority Data

Oct. 10, 2001   (JP)   .............. P2001-312698

(51) Int. Cl.
G06F 3/12   (2006.01)
G06K 15/02   (2006.01)

(52) U.S. Cl. ........................ 358/1.1; 358/1.9
(58) Field of Classification Search ............... 358/1.16, 358/1.15, 515, 1.9, 1.1, 1.14; 712/220
See application file for complete search history.

(56) References Cited

U.S. PATENT DOCUMENTS 5,129,049 A * 7/1992 Cuzzo et al. .............. 358/1.14
6,100,998 A   8/2000 Nagao et al.
6,191,867 B1 * 2/2001 Shor et al. .................. 358/1.9
6,330,072 B1 * 12/2001 Barada et al. ............. 358/1.18
6,819,447 B1 * 11/2004 Sawano ..................... 358/1.16

FOREIGN PATENT DOCUMENTS

| EP | 0 513 775 A2 | 11/1992 |
| EP | 0 821 319 A2 | 1/1998 |
| GB | 0 821 319 A2 * | 5/1998 |
| JP | 2001-270199 | 10/2001 |

* cited by examiner

*Primary Examiner*—Kimberly Williams
*Assistant Examiner*—Scott Schlack
(74) *Attorney, Agent, or Firm*—McDermott Will & Emery LLP

(57) ABSTRACT

A rasterization processor capable of properly selecting a rasterization processing method reducing a non-operating time of an output unit is provided. The rasterization processor acquires the operating state of the output unit and a time up to termination of output operation of the output unit, calculates times for rasterizing page data at a time and consecutively rasterizing a plurality of separation data separated from page data respectively and compares an output operation end time and an at-a-time RIP processing time with each other. On the basis of the result, the rasterization processor selects and executes either rasterization processing. Thus, a rasterization processor maximally keeping the operating time of the output unit and improving efficiency of printing/prepress steps can be provided.

11 Claims, 5 Drawing Sheets

FIG. 3

```
Y SEPARATION:                    PD
   IMAGE DATA
   LINE DRAWING DATA
   TEXT DATA
- - - - - - - - - - - - - - - -
M SEPARATION:
   IMAGE DATA
   LINE DRAWING DATA
   TEXT DATA
- - - - - - - - - - - - - - - -
C SEPARATION:
   IMAGE DATA
   LINE DRAWING DATA
   TEXT DATA
- - - - - - - - - - - - - - - -
K SEPARATION:
   IMAGE DATA
   LINE DRAWING DATA
   TEXT DATA
```

FIG. 4A

| OPERATOR | NUMBER |
|---|---|
| ERASEPAGE | 1 |
| FILL | 100 |
| EOFILL | 100 |
| STROKE | 500 |
| UFILL | 10 |
| UEOFILL | 50 |
| USTROKE | 10 |
| RECTFILL | 20 |
| RECTSTROKE | 30 |

FIG. 4B

| NO. | WIDTH(PIX) | HEIGHT(PIX) | BIT PER COMPO | MULTI | ROT |
|---|---|---|---|---|---|
| 1 | 100 | 500 | 3 | 8 | 0° |
| 2 | 300 | 300 | 1 | 8 | 90° |
| 3 | 100 | 250 | 1 | 8 | 180° |
| 4 | 500 | 500 | 1 | 8 | OTHERS |

PAGE DATA PROCESSOR, PAGE DATA PROCESSING METHOD AND PROGRAM

BACKGROUND OF THE INVENTION

1. Field of the Invention

The present invention relates to a page data processor converting page data described in a page data description language to data of a format output-processible by an output device.

2. Description of the Background Art

In the field of printing/prepress, an image processor generally performs rasterization (RIP processing) on page data described in a page description language (hereinafter abbreviated as PDL) represented by PostScript (trade name by Adobe Systems Inc., U.S.A.) or PDF (portable document format) for generating output data and outputs page contents expressed by the page data to a recording medium such as a film, a printing plate or a paper through an output unit such as an image setter, a plate writer or a digital printing machine.

Such page data is generally formed to be separable into a plurality of separation data. The term "separation data" denotes data of specific colors employed in the aforementioned printing, and is also simply referred to as "separation". The verb "separate" denotes operation of obtaining separation data from the page data. Rasterization processing is performed for generating a plurality of rasterized separation data corresponding to some separations. The output unit performs output processing every color on the basis of the rasterized separation data, thereby performing color printing on the basis of the page data.

Two types of methods, i.e., consecutive RIP processing and at-a-time RIP processing are present as rasterization processing methods for generating such a plurality of rasterized separation data. In the consecutive RIP processing, separation and rasterization processing are consecutively performed every separation data for sequentially generating a plurality of rasterized separation data one by one. In the at-a-time RIP processing, rasterization processing is performed at a time on the overall page data for simultaneously generating a plurality of rasterized separation data.

In the consecutive RIP processing, the first one of the plurality of rasterized separation data can be precedently generated. However, a time corresponding to the number of separation data separated from the page data is required for creating all rasterized separation data due to the rasterization processing consecutively performed on the respective separation data.

In the at-a-time RIP processing, generation of all rasterized separation data ends earlier than that in the consecutive RIP processing. However, it is impossible to output only rasterized separation data corresponding to specific emergently required separation data such as the first one of the rasterized separation data due to collective creation of all rasterized separation data.

In consideration of such characteristics, an operator selects either rasterization processing as the need arises.

When the output unit is connected to a rasterization processor rasterizing the page data and the rasterized separation data are directly transmitted to the output unit, either the consecutive RIP processing or the at-a-time RIP processing must be selected in consideration of improvement in efficiency of printing/prepress steps. In other words, improvement in efficiency must be taken into consideration as to not only the rasterization processor but also output operation in the output unit.

That is, there are rasterized separation data requiring a long time for output processing in the output unit as well as rasterized separation data completely output in a short time. When output processing in the output unit ends in a short time, there is a high possibility for a time when the output unit is not in operation, i.e., a non-operating time, and hence it follows that the operation efficiency of the output unit is reduced.

The rasterization processing method in the rasterization processor must be selected also in consideration of this, and this selection process applies an excessive burden on the operator.

SUMMARY OF THE INVENTION

The present invention is directed to a page data processor processing page data described in a page description language.

According to the present invention, a page data processor according to the present invention comprises a) a separation element separating page data into a plurality of separation data; b) a consecutive processing element performing consecutive rasterization processing of consecutively rasterizing the plurality of separation data for sequentially generating a plurality of rasterized separation data output-processible by an output device; c) an at-a-time processing element performing at-a-time rasterization processing of rasterizing the page data at a time for simultaneously generating the plurality of rasterized separation data; d) an output operation end time acquisition element acquiring an output operation end time for ending output operation currently executed by the output device from the output device; e) a consecutive processing time calculation element analyzing the separation data for calculating a consecutive processing time required for the processing by the consecutive processing element; f) an at-a-time processing time calculation element analyzing the page data for calculating an at-a-time processing time required for the processing by the at-a-time processing element; g) a separation output time calculation element calculating a separation output time required by the output device for output-processing the rasterized separation data; and h) a rasterization processing selection element selecting whether to execute the consecutive rasterization processing or the at-a-time rasterization processing on the page data on the basis of the output operation end time, the consecutive processing time, the at-a-time processing time and the separation output time.

According to a preferred embodiment of the present invention, the output operation end time, the consecutive processing time, the at-a-time processing time and the separation output time are previously acquired before rasterizing the page data so that the most efficient method of rasterization processing can be selected and executed on the basis of these values, whereby the non-operating time of the output device can be reduced for improving efficiency of printing/prepress steps.

Accordingly, an object of the present invention is to provide a page data processor, a page data processing method and a program capable of properly selecting an efficient rasterization processing method and reducing a non-operating time of an output unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram for illustrating the contents of page data;

FIGS. 4A and 4B are diagrams showing exemplary cases where an RIP time calculation part sequentially analyzes the description of the page data through processing at a step.

DESCRIPTION OF THE PREFERRED EMBODIMENTS

An embodiment of the present invention is now described.

Figure 1:
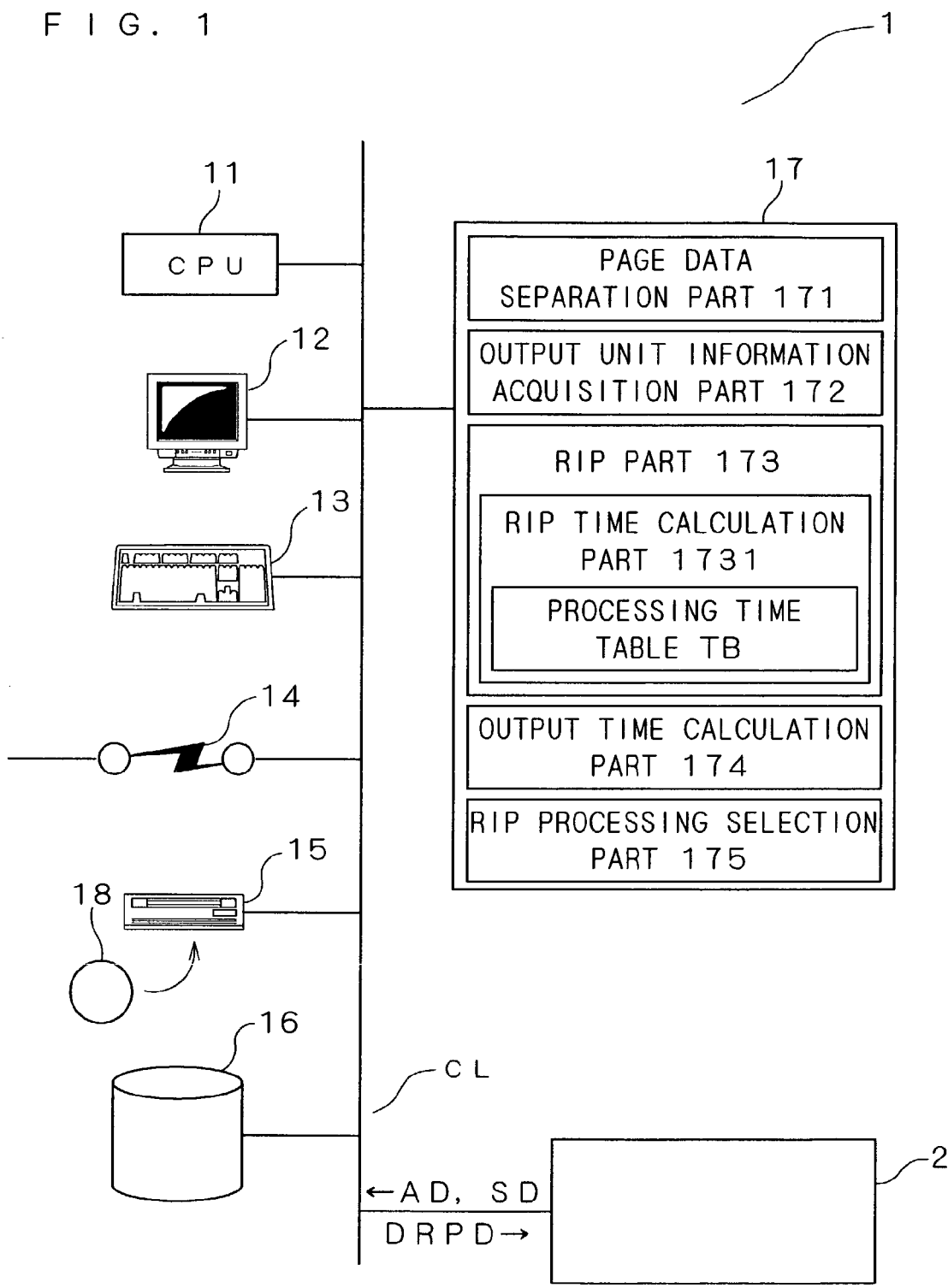
FIG. 1 is a diagram for illustrating the structure of a rasterization processor according to the present invention.

FIG. 1 is a diagram for illustrating the structure of a rasterization processor 1 according to the present invention. The rasterization processor 1 is a generally employed personal computer formed by a CPU 11, a display part 12, an input part 13, a network I/F 14, a media drive 15, a storage part 16 and a memory 17. The CPU 11, controlling the overall rasterization processor 1, runs a program recorded in a media disk 18 inserted in the media drive 15 through the memory 17, thereby implementing functions of the rasterization processor 1 in particular. The display part 12 is employed for displaying information necessary for rasterization processing. The input part 13, formed by a mouse and a keyboard, is used by an operator for inputting instructions in the rasterization processor 1. The network I/F 14 is employed for connecting the rasterization processor 1 with a network (not shown). The rasterization processor 1 can receive page data PD from a terminal (not shown) connected to the network through the network I/F 14. It is also possible to download a program implementing the functions of the rasterization processor 1 from a server (not shown). When an output unit 2 is connected to the rasterization processor 1 through the network, the rasterization processor 1 transmits rasterized separation data DRPD to the output unit 2 through the network I/F 14. The media drive 15 is employed for reading the program recorded in the media disk 18. The program read by the media drive 15 implements the functions of the rasterization processor 1. The storage part 16 stores the program read by the media drive 15. The storage part 16 also stores the page data PD and the rasterized separation data DRPD.

A communication line CL is connected to the output unit 2, so that the rasterization processor 1 transmits the rasterized separation data DRPD generated as a result of rasterization processing and receives operating state information AD and output specification information SD transmitted from the output unit 2 through the communication line CL.

The output unit 2, employed for outputting the rasterized separation data DRPD generated in the rasterization processor 1 to a recording medium, can be formed by an image setter, a printer, a plate recorder or a digital printing machine.

The memory 17 is a work area employed by the CPU 11 for running the program stored in the storage part 16. The CPU 11 runs the program thereby implementing functions of a page data separation part 171, an output unit information acquisition part 172, an RIP part 173, an output time calculation part 174 and an RIP processing selection part 175 in the memory 17.

The page data separation part 171 generates separation data from the page data PD. When performing consecutive RIP processing through a process described later, a plurality of separation data must be separated from the page data PD one by one. Therefore, the page data separation part 171 separates the page data PD for generating separation data from pre-separation data, for performing rasterization processing.

In a process described later, a consecutive RIP processing time and an at-a-time RIP processing time must be compared with each other for selecting either processing on the basis of the result. The page data separation part 171 separates the page data PD also for this case.

The output unit information acquisition part 172 acquires information related to the output unit 2 connected through the communication line CL. The information of the output unit 2 acquired by the output unit information acquisition part 172 includes the state (operating/non-operating) of the output unit 2 and output ability (number of lines/areas output per second) of the output unit 2. When the output unit 2 is in operation, the information further includes the operating state information AD formed by a time (output operation end time) up to termination of output operation and the output specification information SD including the data size of precedently output rasterized data RPD. The output unit information acquisition part 172 acquires the aforementioned information from the output unit 2 connected through the communication line CL, and temporarily stores this information.

The RIP part 173 rasterizes the page data PD and generates the rasterized data RPD.

The RIP part 173 comprises an RIP time calculation part 1731. The RIP time calculation part 1731 calculates a processing time (hereinafter referred to as "at-a-time RIP processing time") for rasterizing the page data PD at a time and a processing time (hereinafter referred to as "consecutive RIP processing time") for consecutively rasterizing the page data PD. The RIP time calculation part 1731 can analyze the script of the page data PD described in a page description language for calculating the respective rasterization processing times from the number of drawing commands included in the script and the types of the drawing commands. Therefore, the RIP time calculation part 1731 comprises a processing time table TB storing command processing times corresponding to the types of the drawing commands respectively.

In advance of rasterization processing of the page data PD, the RIP part 173 calculates the data size of the rasterized separation data DRPD to be generated by this rasterization processing. The RIP part 173 analyzes the script of the separation data separated from the page data PD and calculates the data size of the rasterized separation data DRPD from the resolution for rasterizing the separation data and the numbers of drawing operators and graphics included in the separation data. The calculated data size of the rasterized separation data DRPD is employed for calculating the output time by the output time calculation part 174 described later.

When generating a plurality of separation data from the page data PD, e.g., generating separation data for four colors of Y (yellow), M (magenta), C (cyan) and K (black), the RIP part 173 creates rasterized separation data DRPDy, DRPDm, DRPDc and DRPDk corresponding to the respective separation data. The output unit 2 performs output processing based on these rasterized separation data DRPDy, DRPDm, DRPDc and DRPDk, whereby it follows that the recording medium expresses the contents expressed by the page data PD. Whether by at-a-time RIP processing or by consecutive RIP processing, the same rasterized separation data DRPD are obtained from the same page data PD.

The output time calculation part 174 calculates the time (hereinafter referred to as "separation output time") necessary for performing output processing in the output unit 2 on the basis of the rasterized separation data DRPD. In advance of the rasterization processing, the output time calculation part 174 calculates the separation output time on the basis of the output ability of the output unit 2 acquired by the output unit information acquisition part 172 and the data size of the rasterized separation data DRPD.

In the rasterization processing of the page data PD, the RIP processing selection part 175 selects either consecutive RIP processing or at-a-time RIP processing. The RIP processing selection part 175 first refers to the operating state of the output unit 2, and then refers to an output operation end time up to termination of the output processing if the output unit 2 performs output operation, among the information related to the output unit 2 acquired by the output unit information acquisition part 172.

When the output unit 2 is in a non-operating state, i.e., when the output operation end time is zero, the RIP processing selection part 175 selects execution of consecutive RIP processing, and instructs the RIP part 173 to perform consecutive RIP processing as to the page data PD.

When the output unit 2 is in an operating state, the RIP processing selection part 175 compares the output operation end time with the at-a-time RIP processing time calculated by the RIP time calculation part 1731. If the at-a-time RIP processing time is shorter than the output operation end time, the RIP processing selection part 175 instructs the RIP part 173 to execute at-a-time RIP processing. Thus, the RIP part 173 executes at-a-time RIP processing as to the page data PD.

If the at-a-time RIP processing time is longer than the output operation end time, the RIP processing selection part 175 selects either rasterization processing on the basis of the relation between the consecutive RIP processing time, the at-a-time RIP processing time and the separation output time calculated by the output time calculation part 174.

At this time, the RIP processing selection part 175 executes selection on the basis o the following expression:

$$(n-1)E < nr - R \tag{1}$$

where n represents the number of separation data obtained from the page data PD, E represents the separation output time, nr represents the consecutive RIP processing time and R represents the at-a-time RIP processing time respectively.

This expression (1) expresses a case where the difference between the consecutive RIP processing time and the at-a-time RIP processing time is greater than the difference between the sum nE of the separation output times E as to all rasterized separation data DRPD created from the page data PD and the separation output time E as to single rasterized separation data DRPD. This also indicates a case where the at-a-time RIP processing time R+nE is less than the possible minimum value nr+E for the consecutive RIP processing time when the at-a-time RIP processing time is longer than the output operation end time. In other words, it follows that the at-a-time RIP processing is more efficient in this case.

When the condition of the expression (1) is satisfied, therefore, the RIP processing selection part 175 selects at-a-time RIP processing of the page data PD.

Figure 2:
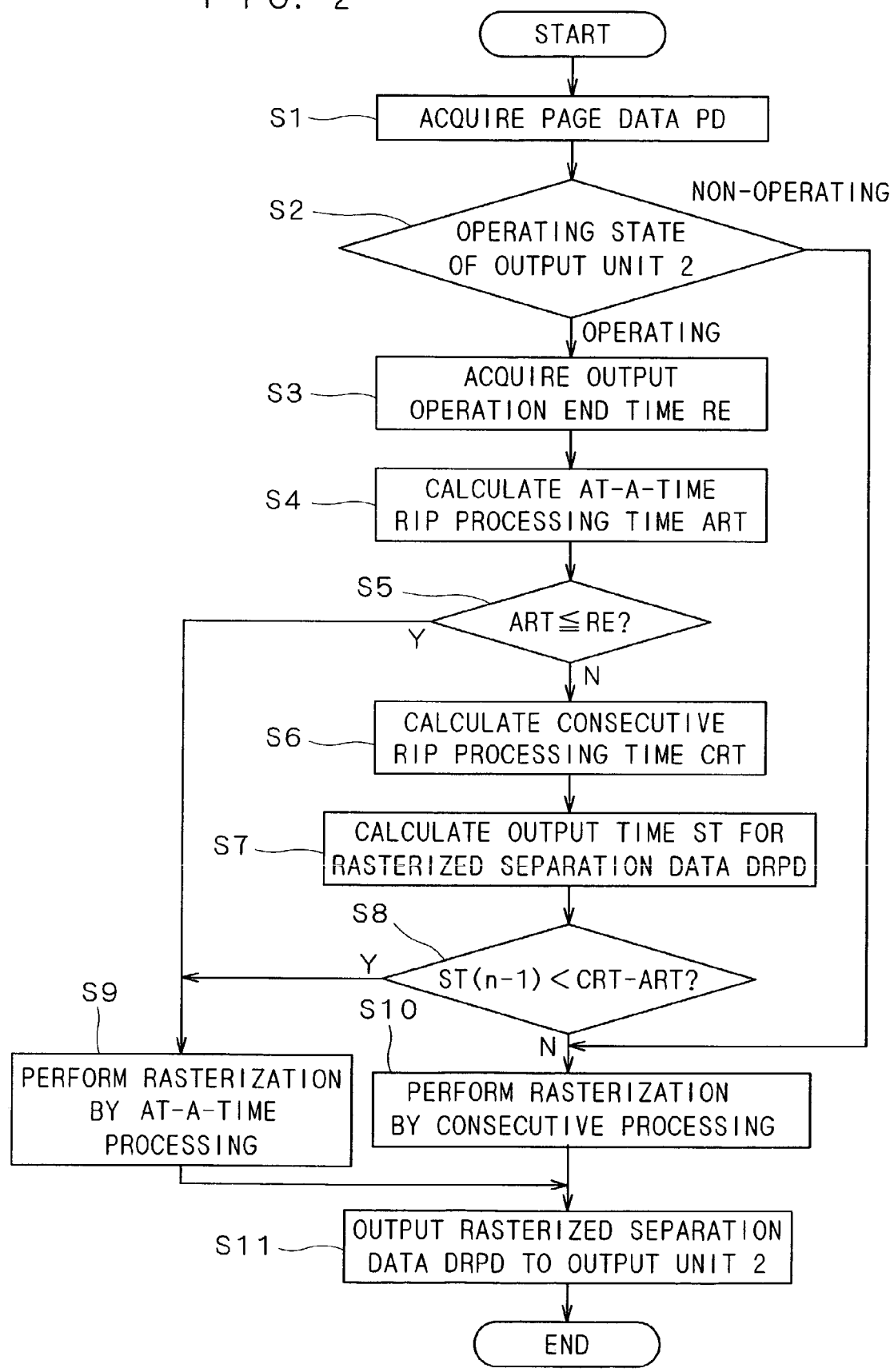
FIG. 2 is a flow chart for illustrating operation of the rasterization processor shown in FIG. 1.

FIG. 2 is a flow chart for illustrating the operation of the rasterization processor 1 shown in FIG. 1.

At a step S1, the rasterization processor 1 acquires the page data PD for rasterization processing. The rasterization processor 1 receives the page data PD from the terminal (not shown) through the network via the network I/F 14. Alternatively, the rasterization processor 1 may create the page data PD through a page data creation part (not shown). The storage part 16 of the rasterization processor 1 stores the page data PD.

At a step S2, the output unit information acquisition part 172 confirms the operating state of the output unit 2 through the communication line CL. The output unit information acquisition part 172 acquires the operating state information AD from the output unit 2 and determines whether or not the output unit 2 is in operation. If the output unit 2 is not in operation, the processing of the rasterization processor 1 shifts to a step S10.

If the output unit 2 is in operation, the processing shifts to a step S3.

At the step S3, the output unit information acquisition part 172 acquires the operating state information AD and the output specification information SD and calculates the output operation end time RE up to termination of the output operation performed in the output unit 2. The output unit information acquisition part 172 acquires the output specification information SD from the output unit 2 and calculates the output operation end time RE up to termination of output operation of the rasterized data RPD in the output unit 2 from the output ability (number of lines/areas output per second) of the output unit 2 and the remaining data size of the rasterized data RPD precedently output from the output unit 2.

Alternatively, the output unit information acquisition part 172 may calculate the output operation end time RE from the expression size of the rasterized data RPD and the output ability of the output unit 2. When the output unit 2 is of an intelligent type and comprises a function of calculating the output operation end time RE by itself, the output unit information acquisition part 172 may acquire the output operation end time RE calculated by the output unit 2 as the operating state information AD.

At a step S4, the RIP time calculation part 1731 calculates an at-a-time RIP processing time ART necessary for rasterizing the page data PD at a time. The RIP time calculation part 1731 reads the page data PD from the storage part 16 and analyzes the script of the page data PD, thereby calculating the at-a-time RIP processing time ART. The script described in the page data PD is formed by contents corresponding to a plurality of separation data, and hence the RIP time calculation part 1731 simultaneously analyzes the same.

FIG. 3 illustrates the contents of the page data PD. As hereinabove described, the page data PD is formed to be separable into a plurality of separation data implementing page expression. More specifically, the page data PD is formed to be separable into a plurality of separation data, i.e., four separation data including Y, M, C and K separations. Image data, line drawing data and text data are described in the script of the page description language to correspond to the respective separation data.

When calculating the at-a-time RIP processing time ART, the RIP time calculation part 1731 analyzes the page data PD in a procedure of analyzing a row of the script described in relation to the Y separation, thereafter analyzing a row of the script described in relation to the M separation, then analyzing single rows in relation to the C and K separations, thereafter analyzing the script described in relation to the Y separation . . . . Thus, the RIP time calculation part 1731 sequentially analyzes the description corresponding to the respective separation data thereby acquiring the numbers of drawing operators describing the image data, the line drawing data and the text data respectively while simultaneously acquiring information as to the sizes of graphics included in the page data PD.

FIGS. 4A and 4B illustrate exemplary cases where the RIP time calculation part 1731 sequentially analyzes the description of the page data PD through the processing at the step S4.

FIG. 4A illustrates an exemplary case where the RIP time calculation part 1731 analyzes the page data PD and acquires the numbers of the respective drawing operations described in the page data PD. Referring to FIG. 4A, the numbers of drawing operators such as "erasepage", "fill", "eofill", "stroke" . . . are acquired as one, 100, 100, 500 . . . respectively.

FIG. 4B illustrates an exemplary case where the RIP time calculation part 1731 analyzes the page data PD and acquires the sizes of respective graphics included in the page data PD. Referring to FIG. 4B, the page data PD includes four graphics. FIG. 4B also shows the sizes of the respective graphics.

After acquiring the information related to the numbers of the drawing operators and the sizes of the graphics, the RIP time calculation part 1731 calculates the at-a-time RIP processing time ART necessary for raseterizing the page data PD at a time.

The at-a-time RIP processing time ART is calculated as follows:

$$ART = TS + TG \quad (2)$$

where TS represents the sum of times necessary for executing stroke operators among the drawing operators, and TG represents the sum of times necessary for executing image operators among the drawing operators.

The processing time table TB comprised in the RIP time calculation part 1731 stores parameters expressing times necessary for processing single drawing instructions of the drawing operators respectively. The processing time table TB also stores parameters expressing processing times of the respective graphics per unit size and processing times responsive to angles of rotation. The RIP time calculation part 1731 calculates the at-a-time RIP processing time ART with reference to the processing time table TB.

The sum TS of the times necessary for executing the respective stroke operators can be obtained by adding up values obtained by multiplying processing times for single drawing instructions by the number of the instructions as to all drawing instructions, as follows:

$$TS = \Sigma(TSi \times Ni) \quad (3)$$

where $TSi$ represents a time necessary for processing each drawing instruction, $Ni$ represents the number of the drawing instructions, and $\Sigma$ represents the sum of i=1, 2, . . . , M (M: the number of types of the drawing instructions) respectively.

The sum TG of the times necessary for executing the respective image operators, depending on the sizes of the respective graphics, can be obtained as follows:

$$TG = \Sigma TGi = \Sigma(SZi \times Ci \times Di) \quad (4)$$

where $SZi$ represents the size of each graphic, $Ci$ represents the processing time per unit size, and $Di$ represents a rotation factor set in response to the angle of rotation of the graphic. When graphic drawing is accompanied by rotation, the size of the graphic exceeds that in general drawing, and hence the sum TG can be more correctly calculated by multiplication by the rotation factor $Di$ set in response to the angle of rotation.

The RIP time calculation part 1731 calculates the at-a-time RIP processing time ART necessary for rasterizing the page data PD at a time through the above expressions (2), (3) and (4). The RIP time calculation part 1731 temporarily stores the calculated at-a-time RIP processing time ART. Alternatively, the storage part 16 may store the at-a-time RIP processing time ART.

At a step S5, the RIP processing selection part 175 compares the at-a-time RIP processing time ART calculated by the RIP time calculation part 1731 with the output operation end time RE of the output unit 2 acquired by the output unit information acquisition part 172. If the at-a-time RIP processing time ART is less than the output operation end time RE, the operation of the rasterization processor 1 shifts to a step S9. If the at-a-time RIP processing time ART is greater than the output operation end time RE to the contrary, the operation of the rasterization processor 1 shifts to a step S6.

At the step S6, the RIP time calculation time 1731 calculates the consecutive RIP processing time CRT necessary for consecutively rasterizing the page data PD. In order to calculate the consecutive RIP processing time CRT, the page data separation part 171 sequentially separates the page data PD into a plurality of separation data. If the page data PD is formed to be separable into the four separations of Y, M, C and K, for example, the page data separation part 171 can execute separation of the page data PD by separating scripts describing the Y separation, the M separation, the C separation and the K separation respectively from the page data PD. Then, the RIP time calculation part 1731 selects any separation data DV separated from the page data PD, analyzes the script describing the separation data DV, acquires the numbers of the respective drawing operators describing the image data, the line drawing data and the text data respectively, also acquires the information related to the sizes of the graphics included in the separation data DV, and calculates the rasterization processing time for the separation data DV according to the expressions (2), (3) and (4) of the step S4.

Calculated at this time is the time for rasterizing the separation data DV obtained by separating the page data PD, and hence the RIP time calculation part 1731 can calculate the consecutive RIP processing time CRT by multiplying the number of the separation data DV by the rasterization processing time for the separation data DV.

Alternatively, the RIP time calculation part 1731 may calculate the consecutive RIP processing time CRT by calculating the rasterization processing times for all separation data DV and adding up the same.

At a step S7, the output time calculation part 174 calculates a separation output time ST for outputting the rasterized separation data DRPD obtained by rasterizing the separation data DV from the output unit 2. In order to calculate the separation output time ST, the RIP part 173 calculates the data size of the rasterized separation data DRPD generated by rasterizing the separation data DV. The RIP part 173 can obtain the data size of the rasterized separation data DPRD through the numbers of drawing scripts and graphics included in the described contents of the separation data DV and the resolution for generating the rasterized separation data DRPD without performing rasterization processing.

The output time calculation part 174 calculates the time necessary for outputting the rasterized separation data DRPD from the output unit 2 through the output ability (number of lines/areas output per second) of the output unit 2 included in the output specification information SD acquired by the output unit information acquisition part 172 and the data size of the rasterized separation data DRPD obtained by the RIP part 173. The output unit information acquisition part 172 can calculate the separation output time ST by obtaining the output data size of the output unit 2 per second from the acquired output ability of the output unit 2 and comparing the same with the data size of the rasterized separation data DRPD.

Alternatively, the output unit information acquisition part 172 may calculate the separation output time ST from the size for performing expression based on the rasterized separation data DRPD on the recording medium and the output ability of the output unit 2.

Further alternatively, the output unit information acquisition part 172 may repetitively acquire output times of the output operation performed in the output unit 2 for employing the average of the acquired output times as the separation output time ST.

At a step S8, the RIP processing selection part 175 selects the rasterization processing method for the page data PD from the relation between the consecutive RIP processing time CRT, the at-a-time RIP processing time ART and the separation output time ST. When the condition expressed in the following expression (5) is satisfied, the processing shifts to a step S9 so that the RIP processing selection part 175 rasterizes the page data PD by at-a-time RIP processing. If this condition is not satisfied, the processing shifts to a step S1 so that the RIP processing selection part 175 rasterizes the page data PD by consecutive RIP processing.

$$(n-1)ST < CRT - ART \tag{5}$$

where ST represents the separation output time, n represents the number of separations separated from the page data PD, CRT represents the consecutive RIP processing time calculated by the RIP time calculation part 1731 and ART represents the at-a-time RIP processing time calculated by the RIP time calculation part 1731.

As hereinabove described, it is more effective to rasterize the page data PD at a time if the expression (5) is satisfied, and hence the processing shifts to the step S9.

At the step S9, the RIP part 173 rasterizes the page data PD by at-a-time RIP processing according to the selection of the RIP processing selection part 175 at the step S8. The RIP part 173 generates the rasterized separation data DRPD corresponding to the plurality of separation data respectively by rasterizing the page data PD at a time. The storage part 16 stores the generated rasterized separation data DRPD respectively.

At the step S10, the RIP part 173 performs consecutive RIP processing according to the selection of the RIP processing selection part 175 at the step S8. If the processing shifts from the step S2 to the step S10, the page data separation part 171 separates the page data PD into the plurality of separation data DV. The RIP part 173 consecutively rasterizes the separated separation data DV and generates the rasterized separation data DRPD corresponding thereto. The storage part 16 stores the generated rasterized separation data DRPD respectively.

FIGS. 5A to 5D are diagrams for illustrating the relation between the operating times of the rasterization processor 1 and the output unit 2 in cases of executing consecutive RIP processing and at-a-time RIP processing on the page data PD separable into the Y, M, C and K separations.

Figure 5A:
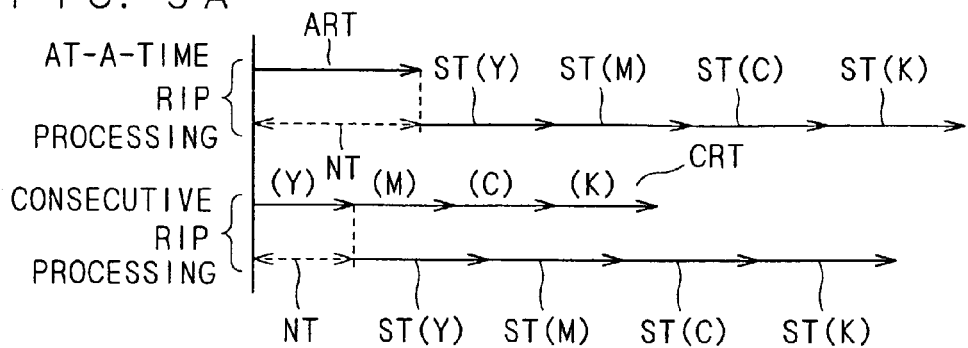
FIGS. 5A to 5D are diagrams for illustrating efficiency of printing/prepress steps in cases where the rasterization processor executes consecutive RIP processing and at-a-time RIP processing.

FIG. 5A is a diagram for illustrating a case where the output unit 2 is not in operation at the step S2. When the output unit 2 is not in operation, the rasterization processor 1 may intrinsically execute either consecutive RIP processing or at-a-time RIP processing, while the non-operating time of the output unit 2 can be more shortened by the consecutive RIP processing in general. This is because the rasterized separation data DRPD as to single separation data can be most quickly obtained when creating the rasterized separation data DRPD by consecutive RIP processing and hence the output unit 2 can be immediately operated while all rasterized separation data DRPD are simultaneously created in the at-a-time RIP processing and hence the non-operating time NT of the output unit 2 exceeds that in the case of consecutive RIP processing.

When the output unit 2 is not in operation, therefore, the rasterization processor 1 generates the rasterized separation data DRPD by consecutive RIP processing according to the determination at the step S2. Thus, the non-operating time NT of the output unit 2 can be reduced, whereby efficiency of printing/prepress steps is improved.

Figure 5B:
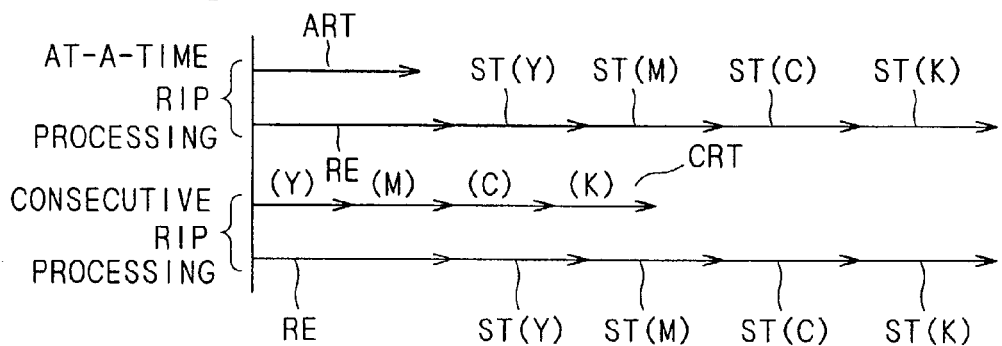

FIG. 5B is a diagram for illustrating the step S5. At the step S5, the output unit 2 is in operation and the RIP processing selection part 175 compares the output operation end time RE necessary for completely precedently outputting the rasterized data RPD from the output unit 2 and the at-a-time RIP processing time ART necessary for at-a-time RIP processing. When the at-a-time RIP processing time ART is less than the output operation end time RE as shown in FIG. 5B, the rasterization processing of the rasterization processor 1 ends before the output unit 2 terminates the output operation, and hence no non-operating time results in the output unit 2. Further, the operating time of the rasterization processor 1 may be shorter than that in consecutive RIP processing. Thus, the efficiency of the printing/prepress steps is improved.

Figure 5C:
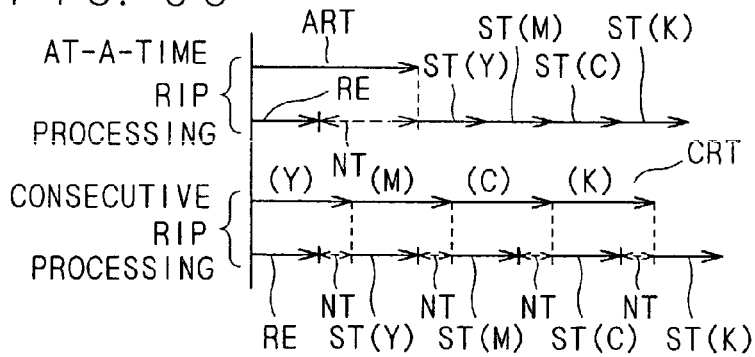
Figure 5D:
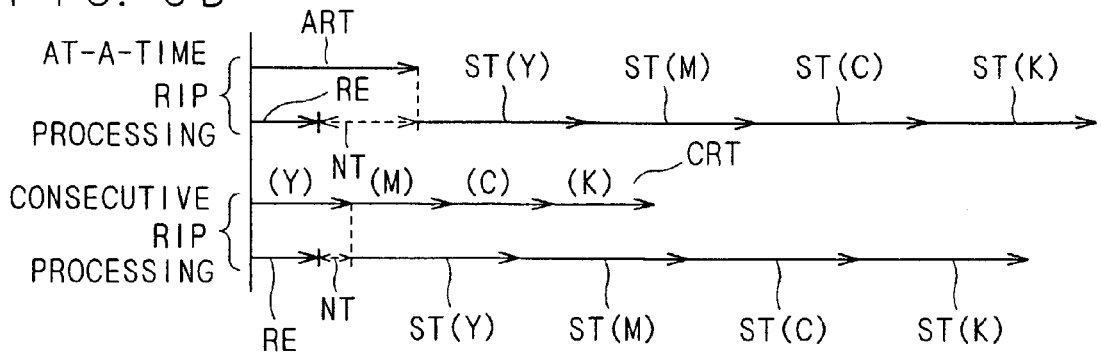

FIGS. 5C and 5D are diagrams for illustrating the step S8. The processing advances to the step S8 when the at-a-time RIP processing time ART is greater than the output operation end time RE, and hence creation of the rasterized separation data DRPD is not terminated when the precedent rasterized data RPD is completely output in the case of at-a-time RIP processing. If the separation output time ST for the rasterized separation data DRPD is so sufficiently short as to satisfy the expression (5) as shown in FIG. 5C, however, the non-operating time NT of the output unit 2 is reduced in total by creating the rasterized separation data DRPD by at-a-time RIP processing and it follows that efficient output processing can be performed as viewed from the whole of the rasterization processor 1 and the output unit 2.

Also when the output unit 2 is in operation and at-a-time RIP processing is not terminated before termination of the operation thereof, therefore, the rasterization processor 1 generates the rasterized separation data DRPD by at-a-time RIP processing if the condition of the step S8 is satisfied. Thus, the non-operating time NT of the output unit 2 can be reduced, whereby the efficiency of the printing/prepress steps is improved.

FIG. 5D is a diagram for illustrating a case where the expression (5) is not satisfied at the step S8 but the processing advances to the step S10 for performing consecutive RIP processing on the page data PD. As shown in FIG. 5D, the non-operating time NT of the output unit 2 can be reduced for improving the efficiency of the printing/prepress steps by generating the rasterized separation data DRPD by consecutive RIP processing when the at-a-time RIP processing time ART is longer than the output operation end time RE and the separation output time ST for the rasterized separation data DRPD is sufficiently long.

When the processing at the step S9 or S10 ends and the respective rasterized separation data DRPD are generated from the page data PD, the rasterization processor 1 reads the rasterized separation data DRPD from the storage part 16 respectively and transmits the same to the output unit 2 respectively through the communication line CL. The output unit 2 outputs the contents expressed by the respective rasterized separation data DRPD to the recording medium.

Thus, the rasterization processor 1 shown in FIG. 1 operates according to the flow chart shown in FIG. 2, whereby disadvantages of the prior art can be overcome and the non-operating time of the output unit 2 can be reduced for implementing efficient printing/prepress steps.

While the invention has been shown and described in detail, the foregoing description is in all aspects illustrative and not restrictive. It is therefore understood that numerous modifications and variations can be devised without departing from the scope of the invention.

What is claimed is:

1. A page data processor processing page data described in a page description language, comprising:
   a) a color separation element for separating said page data formed to be separable into a plurality of color separation data into said plurality of color separation data;
   b) a first rasterizing element for performing first rasterization of consecutively rasterizing said plurality of color separation data to sequentially generate a plurality of rasterized color separation data output-processible by an output device;
   c) a second rasterizing element for performing second rasterization of rasterizing said page data to generate said plurality of rasterized color separation data at a time;
   d) an output operation end time acquisition element for acquiring an output operation end time for ending output operation currently executed by said output device from said output device;
   e) a first rasterizing time calculation element for calculating a first rasterizing time required for said first rasterization;
   f) a second rasterizing time calculation element for calculating a second rasterizing time required for said second rasterization;
   g) a separation output time calculation element for calculating a separation output time required by said output device for output-processing each of said plurality of rasterized color separation data; and
   h) a selection element for selecting whether to execute said first rasterization or said second rasterization on the basis of said output operation end time, said first rasterizing time, said processing second rasterizing time and said separation output time, wherein
   said selection element executes selection according to the following conditions:
   a first condition: RE=0;
   a second condition: ART$\geq$RE; and
   a third condition: CRT−ART>(n−1)ST
   where RE represents said output operation end time, CRT represents said first rasterizing time, ART represents said second rasterizing time, ST represents said separation output time, and n (n: integer) represents the number of said rasterized separation data.

2. The page data processor according to claim 1, wherein said selection element selects said first rasterization when said first condition is satisfied.

3. The page data processor according to claim 1, wherein said selection element selects said time second rasterization when said first condition is unsatisfied and said second condition is satisfied.

4. The page data processor according to claim 1, wherein said selection element selects said second rasterization when said first condition and said second condition are unsatisfied and said third condition is satisfied.

5. The page data processor according to claim 1, wherein said selection element selects said first rasterization when none of said first condition, said second condition and said third condition is satisfied.

6. A page data processing method processing page data described in a page description language, comprising the steps of:
   a) separating said page data formed to be separable into a plurality of color separation data into said plurality of color separation data;
   b) performing first rasterization of consecutively rasterizing said plurality of color separation data to sequentially generate a plurality of rasterized color separation data output-processible by an output device;
   c) performing second rasterization of rasterizing said page data to generate said plurality of rasterized color separation data at a time, said step b) and said step c) being in the alternative;
   d) acquiring an output operation end time for ending output operation currently executed by said output device from said output device;
   e) calculating a first rasterizing time required for said first rasterization in said step b);
   f) calculating a second rasterizing time required for said second rasterization in said step c);
   g) calculating a separation output time required by said output device for output-processing each of said plurality of rasterized color separation data; and
   h) selecting whether to perform said first rasterization in said step b) or said second rasterization in said step c) on the basis of said output operation end time, said first rasterizing time, said second rasterizing time and said separation output time, wherein
   selection in said step h) is executed according to the following conditions:
   a first condition: RE=0;
   a second condition: ART$\geq$RE; and
   a third condition: CRT−ART>(n−1)ST
   where RE represents said output operation end time, CRT represents said first rasterizing time, ART represents said second rasterizing time, ST represents said separation output time, and n (n: integer) represents the number of said rasterized separation data.

7. The page data processing method according to claim 6, wherein
   said first rasterization is selected in said step h) when said first condition is satisfied.

8. The page data processing method according to claim 6, wherein
   said second rasterization is selected in said step h) when said first condition is unsatisfied and said second condition is satisfied.

9. The page data processing method according to claim 6, wherein
said second rasterization is selected in said step h) when said first condition and said second condition are unsatisfied and said third condition is satisfied.

10. The page data processing method according to claim 6, wherein
said first rasterization is selected in said step h) when none of said first condition, said second condition and said third condition is satisfied.

11. A computer-readable medium bearing a program, when executed, causing a computer to implement the following elements:
 a) a color separation element for separating page data formed to be separable into a plurality of color separation data into said plurality of color separation data;
 b) a first rasterizing element for performing first rasterization of consecutively rasterizing said plurality of color separation data to sequentially generate a plurality of rasterized color separation data output-processible by an output device;
 c) a second rasterizing element for performing second rasterization of rasterizing said page data to generate said plurality of rasterized color separation data at a time;
 d) an output operation end time acquisition element for acquiring an output operation end time for ending output operation currently executed by said output device from said output device;
 e) a first rasterizing time calculation element for calculating a first rasterizing time required for said first rasterization;
 f) a second rasterizing time calculation element for calculating a second rasterizing time required for said second rasterization;
 g) a separation output time calculation element for calculating a separation output time required by said output device for output-processing each of said plurality of rasterized color separation data; and
 h) a selection element for selecting whether to execute said first rasterization or said second rasterization on the basis of said output operation end time, said first rasterizing time, said second rasterizing time and said separation output time, wherein said selection element executes selection according to the following conditions:

a first condition: $RE=0$;

a second condition: $ART \geq RE$; and a third condition: $CRT-ART>(n-1)ST$ where RE represents said output operation end time, CRT represents said first rasterizing time, ART represents said second rasterizing time, ST represents said separation output time, and n (n: integer) represents the number of said rasterized separation data.

* * * * *